United States Patent
Cook et al.

(10) Patent No.: US 7,552,130 B2
(45) Date of Patent: Jun. 23, 2009

(54) OPTIMAL DATA STORAGE AND ACCESS FOR CLUSTERED DATA IN A RELATIONAL DATABASE

(75) Inventors: James C. Cook, Georgetown, KY (US); Patrick E. McCamish, Lexington, KY (US); Gary M. Quesenberry, Clayton, NC (US); Robert C. Robinson, Jr., Creedmoor, NC (US); John S. Warren, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/581,909

(22) Filed: Oct. 17, 2006

(65) Prior Publication Data

US 2008/0091698 A1   Apr. 17, 2008

(51) Int. Cl.
  *G06F 17/30* (2006.01)
  *G06F 7/00* (2006.01)
(52) U.S. Cl. .................. 707/101; 707/102; 707/204
(58) Field of Classification Search ........... 707/101, 707/102, 204
See application file for complete search history.

(56) References Cited

U.S. PATENT DOCUMENTS

| | | | |
|---|---|---|---|
| 5,995,960 A * | 11/1999 | Lochner et al. | 707/3 |
| 6,539,396 B1 * | 3/2003 | Bowman-Amuah | 707/103 R |
| 6,615,219 B1 | 9/2003 | Bruso et al. | |
| 2002/0028430 A1 | 3/2002 | Driscoll et al. | |
| 2003/0041304 A1 | 2/2003 | Numata et al. | |
| 2005/0071349 A1 | 3/2005 | Jordan et al. | |
| 2005/0182779 A1 | 8/2005 | Perry et al. | |
| 2008/0021914 A1 * | 1/2008 | Davies et al. | 707/101 |

OTHER PUBLICATIONS

Oracle® XML Developer's Kit, Programmer's Guide, 10g Release 1, Dec. 2003, Oracle®.*

* cited by examiner

*Primary Examiner*—Kuen S Lu
(74) *Attorney, Agent, or Firm*—Arthur Samodovitz; Karuna Ojanen; Hamre, Schumann, Mueller & Larson, P.C.

(57) ABSTRACT

A computerized method, program product, and a service that facilitates the storage of multiple rows of data in a relational database. If the data is clustered data, the method, program product and the service first obtains the clustered data from its source. An identifying primary key of the clustered data is resolved, and the clustered data is parsed, compressed and stored as a binary large object (BLOB). The BLOB may be stored within the relational database or may be stored separately. Storage and access times for large amount of data used in relational databases are optimized.

10 Claims, 4 Drawing Sheets

Traditional Clustered Data Storage in a Relational Database

| System Identifier | Date | Hour | Processor Utilization | Memory Utilization |
|---|---|---|---|---|
| 1 | 2006-01-01 | 0 | 12.34 | 85.67 |
| 1 | 2006-01-01 | 1 | 43.23 | 93.45 |
| 1 | 2006-01-01 | 2 | 54.54 | 95.44 |
| ... | 2006-01-01 | ... | ... | ... |
| 1 | 2006-01-01 | 24 | 65.55 | 89.00 |

**FIG._1A
(Prior Art)**

Clustered Data Storage in a Relational Database Using BLOBs

FIG._1B

OPTIMAL DATA STORAGE AND ACCESS FOR CLUSTERED DATA IN A RELATIONAL DATABASE

FIELD OF THE INVENTION

This invention relates to storage of databases and large amounts of data, and more particularly relates to storing clustered data that occupies many rows of a relational database as a compressed binary large object (BLOB).

BACKGROUND OF THE INVENTION

Much of the following background on relational databases is taken from *Introduction to Relational Databases-Part* 1: *Theoretical Foundation* by Tore Bostrup, at http://www.15seconds.com/Issue/020522.htm?voteresult=5. An important aspect of today's world is information: obtaining it; organizing it; storing it; accessing it, etc. Indeed, much of the world's computing power is dedicated to maintaining and using information, typically stored in databases. All kinds of data, from electronic mail and contact information to financial data, records of sales, performance data of processing units are stored in some form of a database. Realizing the importance of meaningful storage of data, in 1970 Dr. E. F. Codd, developed the relational model of databases based on how users perceive data and a mathematical theory of relations. The relational model represents data as logical entities in which each logical entity represents some real-world person, place, thing, or event about which information is collected. A relational database is a set of tables derived from logical entities and manipulated in accordance with the relational model of data. The basic objects in the database are tables, columns, views, indexes, constraints (relationships), and triggers. Articles by Dr. E. F. Codd throughout the 1970s and 80s such as *TWELVE RULES FOR RELATIONAL DATABASES* and *Is YOUR DBMS REALLY RELATIONAL?* published in COMPUTERWORLD on Oct. 14, 1985 and *DOES YOUR DBMS RUN BY THE RULES?* published in COMPUTERWORLD on Oct. 21, 1985 are still referenced for implementation of relational databases. The twelve rules now number 333 rules and are published in *The Relational Model for Database Management, Version* 2 (Addison-Wesley, 1990).

The problem with data is that it changes. Not only do the values change but also a datum's structure and use, especially when kept for extended periods of time. Even for public records maintained in perpetuity, there may be changes in what data are captured and recorded and how. Normalization avoids problems resulting from duplication of data values and modification of structure and content; normalization ensures data consistency and stability, minimizes data redundancy, ensures consistent updatability and maintainability of the data, and avoids "update and delete" anomalies that result in ambiguous data or inconsistent results.

The normalization process is based on collecting an exhaustive list of all data to be maintained in the database and starting the design with a few "superset" tables. For normalization, the first normal form removes repeating or multivalued attributes to another child entity; basically, the first normal form ensures that the data is represented as a proper table, i.e., the formal name for "table" is "relation." While key to the relational principles, this is somewhat a motherhood statement. In addition, there are six properties of a relational table: (1) all entries in columns are single-valued; (2) entries in the same column are of the same kind; (3) each row is unique; (4) the sequence of columns is insignificant; (5) the sequence of rows is insignificant; and (6) each column has a unique name.

The most common sins against the first normal form are the lack of a primary key and the use of "repeating columns" wherein multiple values of the same type are stored in multiple columns. The second normal form removes attributes that are not dependent on the whole primary key to make sure that each column is defined in the correct table, or more formally that each attribute is kept with the entity that it describes. The third normal form removes attributes that depend on other so that data that can either be derived from other columns or belong in another table should not be stored in the database. Some database designers may apply additional levels of normalization.

FIG. 1A is a representation of a database for a computer central processing unit's performance. Databases are traditionally configured as a tables with rows and columns. A primary key is one or more columns whose values uniquely identify a row in a table. Examples of primary keys in FIG. 1A include the System Identifier, the Date, the Hour. A key uniquely identifies each row in a table. A domain is the set of permissible values for an attribute. By enforcing key and domain restrictions, the database is assured of being freed from modification anomalies. A candidate key is one or more columns whose values could be used to uniquely identify a row in a table. The primary key is chosen among a table's candidate keys.

The background discussion will now shift to describing a binary large object (BLOB). A BLOB is a collection of binary data stored as a single entity in a database management system. BLOBs are typically images, audio or other multimedia object, though binary code is sometimes stored as a BLOB. Database support for BLOBs is not universal. A BLOB has no structure which can be interpreted by the database management system; it is known only by its size and location. Most mainframe-style database engines, with the exception of some recent object-relational engines, only store BLOB data and do not attempt to manipulate it in any way. Once a BLOB is stored on a remote database server, all identifying features that associate it with a particular application are lost. Therefore, any association between a BLOB's contents and the application used to create and maintain it must be maintained separately. For example, most video recordings are stored as AVI files, and opened by default with the web server's video program. Thus, to display a BLOB, the following sequence of events takes place. The web server extracts the BLOB's bytes from the database server and creates a temporary file in a folder on the web server. This file is assigned the appropriate extension, and a hyperlink to the file is created on the web page that is generated for the user. Typically, there have been no means for an end-user to upload or edit a BLOB to or in a database through the web client. Instead, uploading is done through the MS-access administrator front end. Similarly, these actions were typically performed by an administrator front-end.

Traditionally, data in a database has been stored in individual rows of the database, and because of this there is a need to store multiple rows of clustered data in a more meaningful way, especially when the data is clustered, i.e., when the data is statistically significant and particularly useful when accessed and analyzed all at once. There is a further need to simplify and speed access to clustered data comprising multiple rows of data in a database. These needs and other that will become apparent are satisfied by the invention as stated below:

SUMMARY OF THE INVENTION

In brief, the invention is a method, an application, a computer program product having a computer-readable medium having instructions to create, and a service to create a binary large object (BLOB) from multiple rows of clustered data of a relational database. The relational database has one or more columns forming "primary keys" or searchable terms. The clustered data is first retrieved from its source and a primary key is determined. The clustered data is then parsed and compressed. The BLOB also includes at least one primary key column, which preferably is not compressed. To request data, a user specifies the primary keys. One or more primary keys are used to locate the corresponding BLOB. The BLOB is decompressed and then decoded into clustered data that is insertible as multiple rows of a relational database. Other user-specified primary keys may be used to search within the decompressed BLOB for the actual rows of data that the user wants.

BRIEF DESCRIPTION OF THE FIGURES

FIG. 1A shows a traditional prior art method of storage and FIG. 1B illustrates how multiple rows of data may be stored as a BLOB in a database in accordance with an embodiment of the invention.

DETAILED DESCRIPTION OF THE INVENTION

Figure 1:
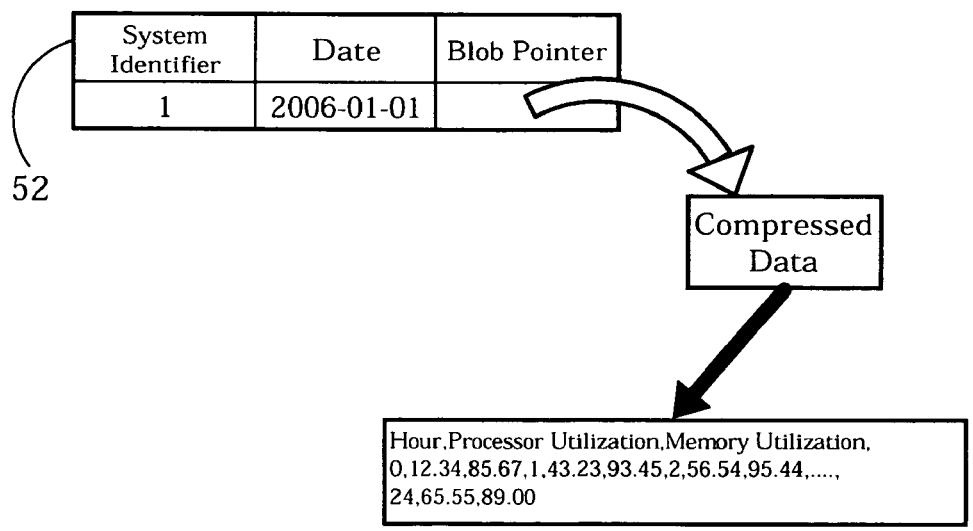
FIGS. 1A and 1B are visual representations of a relational database.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code for creating and storing BLOBs in relational databases and for parsing, interpreting, and de/compressing BLOBs, hereinafter called the BLOB application, may be written in any computer programming language such as JAVA, COBOL, or C, or others. The program object code may execute entirely on a database developer's or user's computer, partly on the database developer's or user's computer, as a stand-alone software package, partly on the database developer's or user's computer and partly on a remote computer or entirely on the remote computer. In the latter scenario, the remote computer may be connected to the database developer's or user's computer through a local area network (LAN) or a wide area network (WAN), or the connection may be made to an external computer via the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
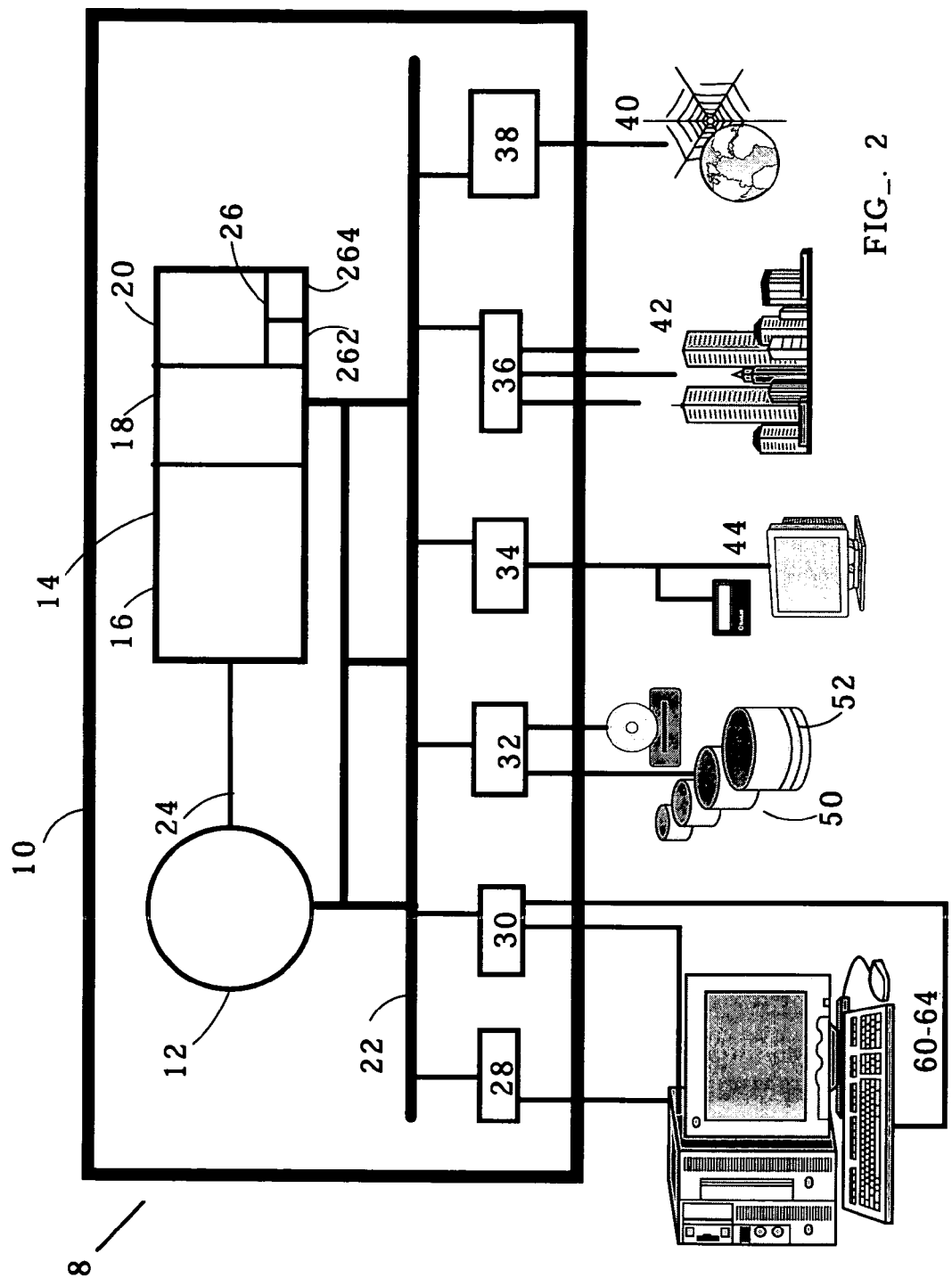
FIG. 2 is a simplified block diagram of a data processing network that can be used to access and store data in accordance with an embodiment of the invention.

Referring to FIG. 2, a high-level block diagram of a computer network system 8 consistent with an embodiment of the invention is shown. Computer network system 8 may comprise any number of networked computers 10, each of which may have a central processing unit (CPU) 12, memory 14, and various digital and/or analog interfaces 28-38. The various devices communicate with each other via an internal communications bus 22. CPU 12 is a general-purpose programmable processor, executing instructions stored in memory 14; while a single CPU is shown in FIG. 2, it should be understood that computer systems having multiple CPUs could be used. CPU 12 is capable of executing an operating system 20 and application(s) including the BLOB application 26, the program instructions which may reside in memory 14. The BLOB application 26 embodies any one of the processes, routines, and modules involved, i.e., obtaining the data, encoding or parsing the data, compressing or decompressing the data, creating the BLOB, storing or reading the BLOB and database and are also capable of generating the computer program or the instructions embodying the processes described herein. Communications bus 22 supports transfer of data, commands and other information between different devices, and while shown in simplified form as a single bus, it is typically structured as multiple buses including an internal bus 24 which may connect the CPU 12 directly with memory 14.

Memory 14 comprises a read-only-memory (ROM) 16 and a random-access memory (RAM) 18 for storing the operating system 20, BLOB application 26 and other applications, and data, including a relational database. Typically, those portions or programs, routines, modules of the operating system 20 necessary to "boot up" are stored in ROM 16. RAM 18 typically stores programs and data that will be erased when the computer turns off. Memory 14 is shown conceptually as a single monolithic entity but it is well known that memory is often arranged in a hierarchy of caches and other memory devices, some or all of which may be integrated into the same semiconductor substrate as the CPU 12. Semiconductor memory devices typically comprise the main storage of computer, as well as any supplemental levels of memory, e.g., cache memories, nonvolatile or backup memories, programmable or flash memories, read-only memories, etc. In addition, memory 14 may be considered to include memory storage physically located elsewhere in computer, e.g., a cache memory in a processor or other storage capacity used as a virtual memory, e.g., as stored on a mass storage device 50 or on another computer coupled to computer via network.

Operating system 20 and BLOB application 26 and other applications reside in memory 14. Operating system 20 provides, inter alia, functions such as device interfaces, management of memory pages, management of multiple tasks, etc. as is known in the art. Examples of such operating systems may include LINUX, AIX, UNIX, Windows-based, OS/400, V/OS, Z/OS, an RTOS, a handheld operating system, etc. These operating systems 20 and other various routines or modules of the BLOB application 26 and other applications, components, programs, objects, modules, etc. may also execute on one or more processors in another computer coupled to computer 10 via a network 40, 42, e.g., in a distributed or client-server computing environment, whereby the processing required to implement the functions of a computer program may be allocated to multiple computers 10 over a network 40, 42.

In general, the BLOB application 26 executed to implement the embodiments of the invention, whether implemented as part of an operating system or a specific application, component, program, object, module or sequence of instructions may be referred to herein as computer programs or simply programs. The BLOB application 26 typically comprise one or more instructions that are resident at various times in various memory and storage in a device and that, when read and executed by one or more processors in the processing device 10, cause that device 10 to perform the steps necessary to execute steps or elements embodying the various aspects of the invention. As illustrated, the BLOB application 26 has a store module 262 that will obtain the original data, parse, compress, and store the data as a BLOB in or associated with a relational database. BLOB Application 26 also has a retrieve module 264 that will retrieve the BLOB, decompress it, deparse it so that the data appears to be in the original form received by the store module 262.

It should be appreciated that computer 10 typically includes suitable analog and/or digital interfaces 28-38 between CPU 12 and the attached components as is known in the art. For instance, computer 10 typically receives a number of inputs and outputs for communicating information externally. For interface with a software developer or operator, computer 10 typically includes one or more software developer input devices 60-64, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 10, e.g., some server implementations, might not support direct user input and output. Terminal interface 34 may support the attachment of single or multiple terminals 44 and may be implemented as one or multiple electronic circuit cards or other units. Data storage 50 preferably comprises one or more rotating magnetic hard disk drive units, although other types of data storage, including a tape or optical driver, could be used. For additional storage, computer 10 may also include one or more mass storage devices 50, e.g., a floppy or other removable disk drive, a hard disk drive, a direct access storage device (DASD), an optical drive e.g., a compact disk (CD) drive, a digital video disk (DVD) drive, etc., and/or a tape drive, among others. A relational database having a compressed BLOB 52 may be stored on one or more of these mass storage devices 50. One of skill in the art will further anticipate that the interfaces 28-38 may also be wireless.

Furthermore, computer 10 may include an interface 36, 38 with one or more networks 40, 42 to permit the communication of information with other computers 10 coupled to the network(s) 40, 42. Network interface(s) 36, 38 provides a physical and/or wireless connection for transmission of data to and from a network(s) 40, 42. Network(s) 40, 42 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 8 may be connected to more than one network 40, 42 simultaneously. Computer system and remote systems 8 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 40, 42. Still yet, any of the components of the method and program products shown in the embodiments of FIG. 2 through FIG. 4 could be deployed, managed, serviced by a service provider who offers services to receive clustered data, and to store the clustered data as a BLOB and the relevant database.

Clustered data refers to data that is meaningful as a group for statistical sampling and analysis. The clustered data preferably is sorted and accessed altogether, as in an atomic read/write operation from/to some electronic memory, but need not necessarily be so. For example, clustered data may pertain to a single batch of manufactured goods, such as a pharmaceuticals. Another example of clustered data may be performance statistics of a computer server that is collected hourly but data for 24 hours is accessed at a time. In this case, the server's performance data has traditionally been stored in a relational table as 24 rows, one row for each hour in the data, such as shown in the prior art FIG. 1A. When a user wished to display the hourly data for a particular server for a given day, the only access pattern for the data was that all 24 rows were read. The inventors realized the shortcomings of this cumbersome and slow storage and access method and, instead of using the traditional approach of storing clustered data as multiple rows in a relational database, stored large amounts of clustered data as a BLOB in the relational database. In this way, the inventors were still able to leverage the utility and the advantages of the relational database.

Figure 3:
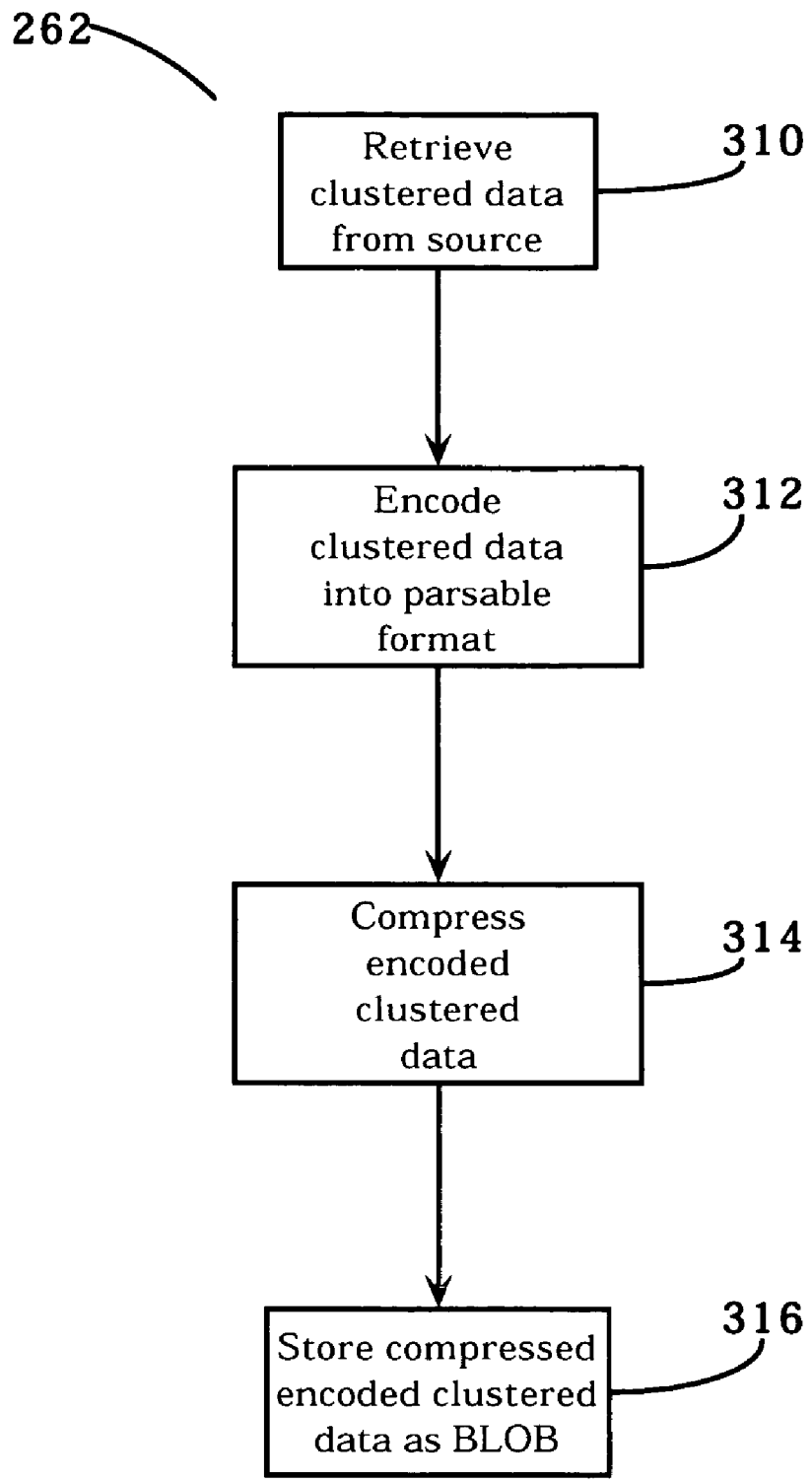
FIG. 3 is a simplified flow chart of how to create and store a BLOB in accordance with an embodiment of the invention. It is suggested that FIG. 3 be printed on the face of the patent.
Figure 4:
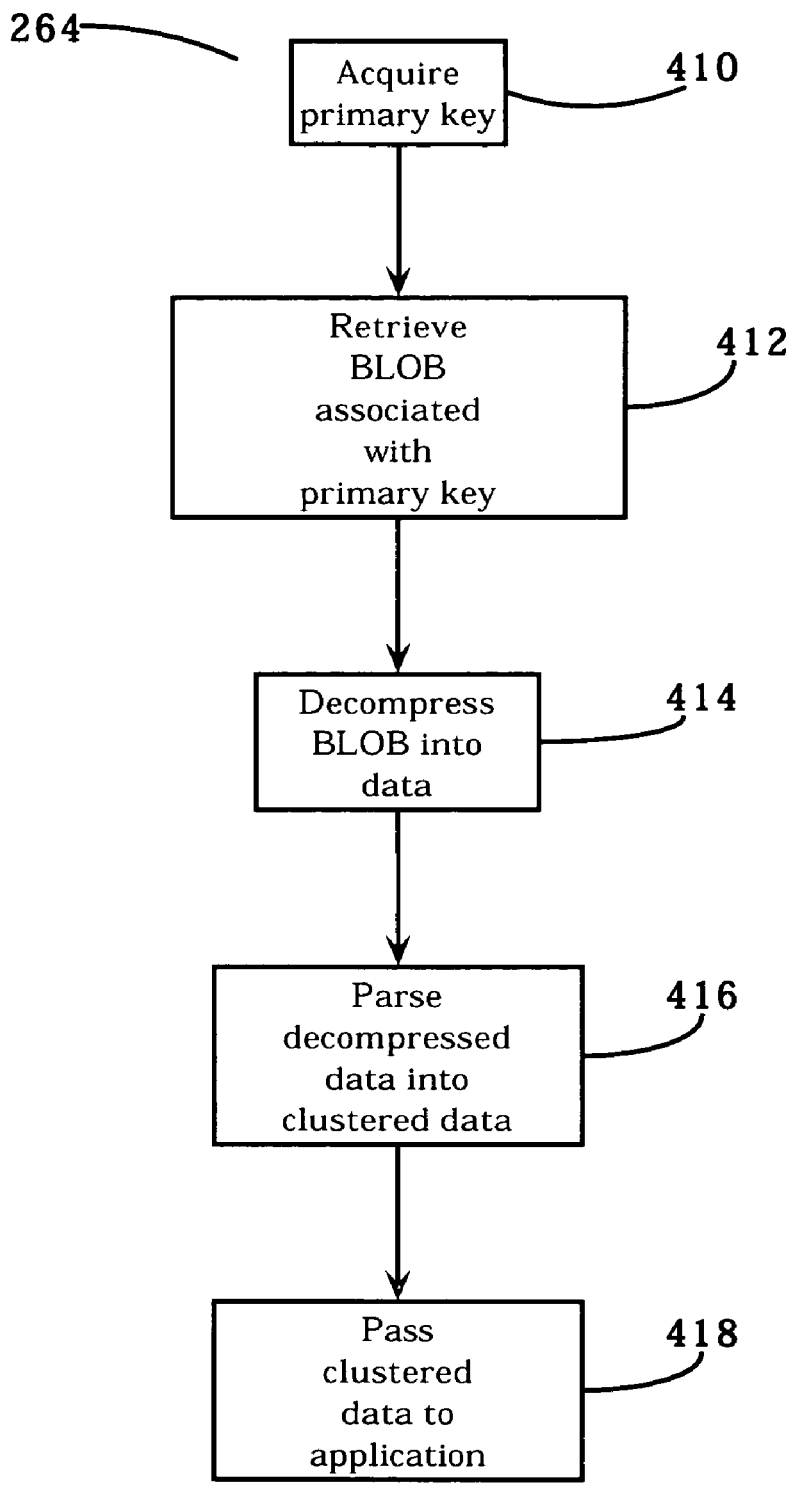
FIG. 4 is a simplified flow chart of a process of how to retrieve and read a BLOB in accordance with an embodiment of the invention.

With respect to FIG. 3, a flow chart of the steps performed by store module 262 of the BLOB application or program 26 described herein to store clustered data as a BLOB is given. In step 310, the store module 262 retrieves the data from its source. For instance, in the case of performance data of a central processing unit, the store module 262 retrieves cache access times, memory access times, etc., from the application which monitors, acquires, and stores the performance data of a particular server. In step 312, a parsing algorithm or routine within the store module 262 encodes the data into a parsable format whereby the computer CPU and the instructions are capable of discerning the data into fields, columns, rows of data for use in a database, i.e., different information in the data can be determined by the context of the data. Suitable parsable formats include but are not limited to XML, comma separated values (CSV), or a tab delimited format such that when the parsing routine within store module 262 encounters an XML delimiter, a comma or a tab, it identifies the data that follows the delimiter to be another field, column, or row in the database until it encounters another delimiter, comma, or tab. One of skill in the art will understand that parsing formats and algorithms other than those based on commas, tabs, or XML indicators can easily be inserted into the store module 262 to separate the fields. It is preferred that at least one identifying primary key field not be encoded or included in the processes described hereinafter, i.e., not be parsed nor compressed. A compression algorithm within the store module 262 herein then compresses the encoded data in step 314. An example of a lossless compression method is GZIP for text data, although other compression algorithms may work as well depending upon the type of data, the desired compression ratio and the time required for compression. After compression, as in step 316, the store module 262 stores the encoded and compressed data in a database or a flat file as a BLOB field. See FIG. 1B as a tangible embodiment wherein the database and the BLOB 52 are stored either at the same memory address or as shown in an alternative embodiment with the database having a pointer to a different memory location having the BLOB. The memory location may be stored across the internet 40 or on a WAN 42 or on another server 44 or in a mass storage 50 such as shown in FIG. 2.

The database has fields which are the primary key fields used to access the data. The method steps of the retrieve module 264 of the application 26 to retrieve the data from the BLOB are shown in the flow chart of FIG. 4. In step 410, the retrieve module 264 reads one or more access key(s), typically one or more primary key fields associated with the database and in particular to the BLOB from user input or an application program interface. In step 412, the retrieve module 264 retrieves the BLOB associated with that primary key field(s) from its memory location. One of skill in the art will appreciated that the encoded compressed BLOB may be stored with the database or in a separate memory location that can be ascertained from the primary key field(s). In step 414, a decompression routine of the retrieve module 264 decompresses the clustered BLOB undoing the results of the compression algorithm used above, e.g., GZIP for text data, which results in the encoded data of the parsable format. In step 416, an inverse of parsing algorithm herein interprets the encoded data and deparses the data whereby when the retrieve module 264 encounters an XML indicator, a comma, a tab, or other delimiter used above, depending upon the parsing algorithm, the retrieve module 264 recognizes the following data as belonging in a separate field, column, or row. Then in step 418, the retrieve module 264 may then pass the decompressed, parsed clustered data to the database or to an application for insertion into the database, so that it appears just like the traditional database having multiple rows, shown in FIG. 1A.

Several advantages occur when the BLOB application 26 described herein stores clustered data of a database as an encoded, compressed BLOB. First, storing large amounts of clustered data as a compressed and parsed BLOB reduces storage requirements. Depending upon the data and the compression algorithm used in the BLOB application, the compression ratio can be 14 to 1 or even greater. Thus, using the compression and storage method described herein for relational databases greatly increases the storage capacity of data without increased hardware costs. Another advantage is that the BLOB application facilitates database maintenance which must be accomplished periodically; the method creates fewer rows in the database tablespaces so the need as well as the time to reorganize tablespaces and perform statistical analysis of the data are less. Yet another advantage is that the BLOB method and application described herein improves access times to the data; because the BLOB program stores and retrieves only one BLOB record from the database as opposed to many different rows of data as in the traditional approach, access time to the data is significantly shortened. Surprisingly, access and retreival time is less than what would have been achieved by compression alone. Not only is access time reduced, there is also less burden on the database subsystem and application and associated network and I/O hardware because only one data access stores or retrieves the BLOB, rather than retrieving or storing multiple rows of data in a large database.

It will be appreciated that variations of some elements are possible to adapt the invention for specific conditions or functions. The concepts of the present invention can be further extended to a variety of other applications that are clearly within the scope of this invention. For instance, the BLOB application may encrypt the data within the process steps of FIG. 3, either before or after encoding; in which case the method would also decrypt the data and would be included in the processes of FIG. 4. As mentioned, the BLOB may be stored separately from the remaining database, but simply retrieved from a memory address or translation associated with a primary key field. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method to store multiple rows of data of a relational database in a computer memory, comprising the steps of a computer processor executing instructions that:
    retrieve clustered data from a source memory; identify at least one identifying primary key of the clustered data, wherein the clustered data is statistically significant when analyzed altogether;
    exclude the at least one primary key, and then encode the clustered data into a computer-readable parsable format;
    compress the encoded clustered data; and
    store the compressed encoded clustered data as a binary large object (BLOB) associated with the relational database in a computer memory.

2. The method of claim 1, wherein the computer-readable parsable format is tab separated.

3. The method of claim 1, wherein the computer processor further executes instructions that apply a GZIP algorithm when compressing the encoded clustered data.

4. The method of claim 1, wherein the binary large object is stored separately from the relational database.

5. The method of claim 1, further comprising the computer processor executing instructions that:
retrieve the binary large object from the relational database stored in the computer memory based on the primary key;
decompress the binary large object into an encoded data stream; and
decode the encoded data stream to be insertible as multiple rows of the relational database in the computer memory.

6. The method of claim 5, further comprising the computer processor executing instructions that insert the decoded data into multiple rows into the relational database in the computer memory using one or more primary keys.

7. A binary large object created by the method of claim 1.

8. A relational database containing the binary large object of claim 6.

9. A computer program product comprising a computer-usable storage medium having computer-usable program code stored thereon, wherein the computer-usable program code, when loaded into the internal memory of a processing device, causes the processing device to:
retrieve clustered data from a digital memory source of the clustered data; derive at least one identifying primary key for the clustered data, wherein the clustered data is statistically significant when analyzed altogether; without including the at least one identifying primary key, encode the clustered data into a computer-readable parsable format;
compress the encoded clustered data; and
store the compressed encoded clustered data as a binary large object retrievable by the at least one identifying primary key and associated with a relational database, the compressed encoded clustered data stored in a computer memory.

10. A computer program product comprising a computer-usable storage medium having computer-usable program code stored thereon, wherein the computer-usable program code, when loaded into the internal memory of a processing device, causes the processing device to:
read at least one identifying primary key for an encoded binary large object stored in a computer memory;
retrieve the binary large object from the computer memory using the identifying primary key, the primary key not encoded with the binary large object;
decompress the binary large object into computer-readable encoded clustered data that is statistically significant when analyzed altogether; and
decode the clustered data to be insertible as multiple rows of data using one or more of the at least one primary keys to a relational database stored in the same or different computer memory.

* * * * *